(12) United States Patent
O'Rourke et al.

(10) Patent No.: US 6,406,926 B1
(45) Date of Patent: Jun. 18, 2002

(54) METHOD OF FORMING A VACUUM MICRO-ELECTRONIC DEVICE

(75) Inventors: Shawn M. O'Rourke, Tempe, AZ (US); Ravichandran Subrahmanyan, Lake Oswego, OR (US)

(73) Assignee: Motorola, Inc., Schaumburg, IL (US)

( * ) Notice: Subject to any disclaimer, the term of this patent is extended or adjusted under 35 U.S.C. 154(b) by 10 days.

(21) Appl. No.: 09/930,241

(22) Filed: Aug. 15, 2001

(51) Int. Cl.$^7$ ................................................ H01L 21/00
(52) U.S. Cl. ........................... 438/20; 445/46; 445/49; 445/50; 445/51
(58) Field of Search ............................ 438/20; 445/46, 445/49, 50, 51

(56) References Cited

U.S. PATENT DOCUMENTS 5,945,780 A     8/1999   Ingle et al.
6,019,657 A  *  2/2000   Chakvorty et al. ........... 445/24

* cited by examiner

Primary Examiner—John F. Niebling
Assistant Examiner—David A. Zarneke
(74) Attorney, Agent, or Firm—William E. Koch

(57) ABSTRACT

A vacuum microelectronic device (10,40) is formed by applying a first conductor (13,14) to a substrate (11) and utilizing the first conductor (13,14) to expose a dielectric material (18) and a second conductive material (19) from a back surface of the substrate (11). A second conductor (29) and a dielectric (28) are formed from the second conductive material (19) and the dielectric material (18), respectively. This method self-aligns the dielectric (28) and the second conductor (29) with the first conductor (13,14). Electron emitters (31,33) of the vacuum microelectronic device (10, 40) are formed on the first conductor (13,14).

20 Claims, 3 Drawing Sheets

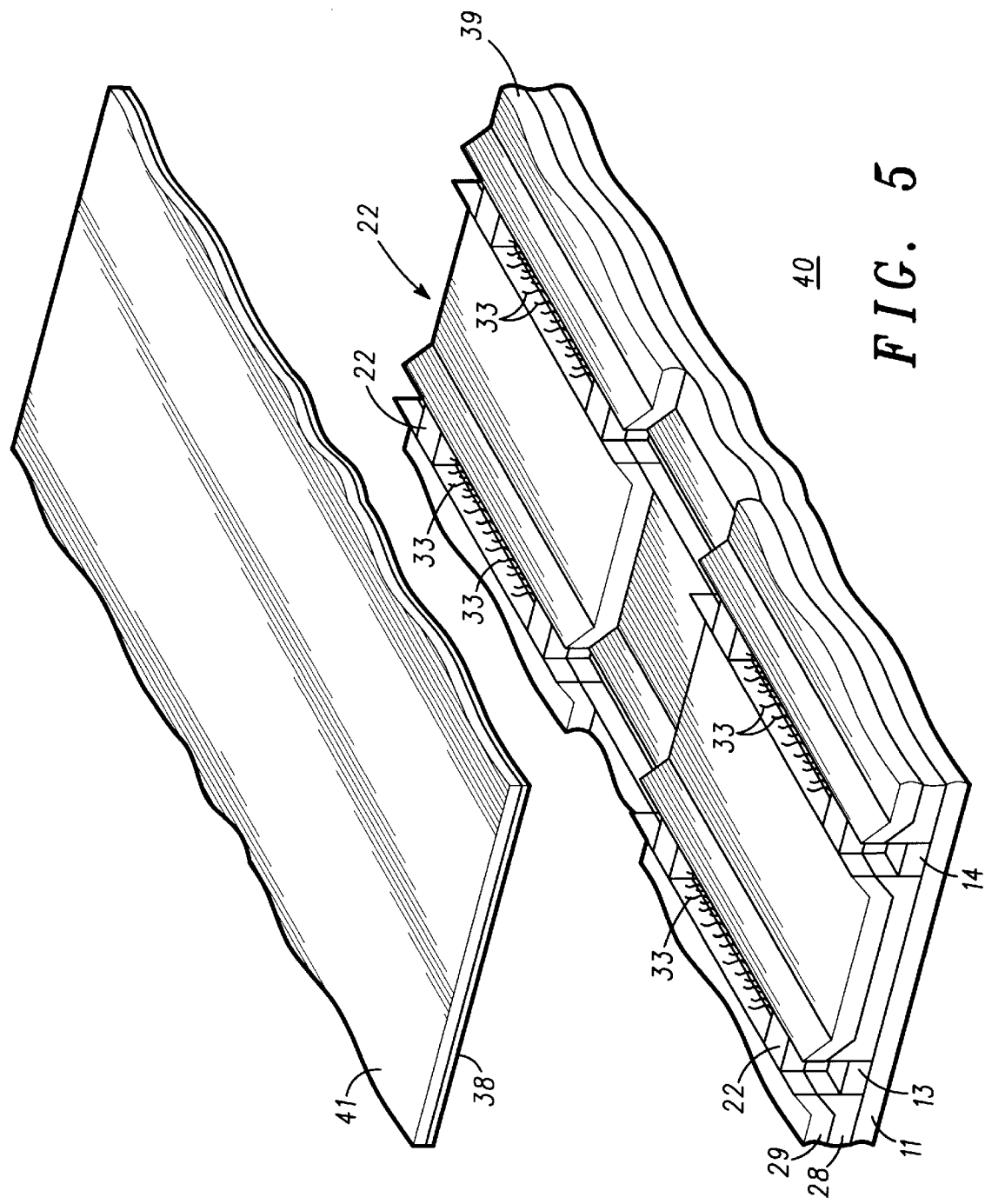

METHOD OF FORMING A VACUUM MICRO-ELECTRONIC DEVICE

BACKGROUND OF THE INVENTION

The present invention relates, in general, to electronics, and more particularly, to vacuum microelectronic devices.

In the past, various semiconductor manufacturing techniques were used to make vacuum microelectronic devices such as field emission displays. Semiconductor manufacturing techniques were utilized because of the small geometries and spacing of the vacuum microelectronic devices. Typically, line widths of less than twenty microns and line spacing of less than thirty microns were required. Critical dimensions (CD) including layer to layer registration or inter-layer alignment, such as registration between two metal layers, required tolerances of less than one micron. Semiconductor exposing, developing, etching, patterning, and deposition techniques such as stepper exposing, RIE etching, and CVD deposition typically were used to form successive layers from the same surface of the substrate in order to achieve the desired line spacing and widths.

One disadvantage of using semiconductor manufacturing techniques is cost. A substrate for a vacuum microelectronic device often requires an area equal to or even greater than that of an entire semiconductor wafer. The high manufacturing costs made the vacuum microelectronic device too costly to manufacture.

Accordingly, there is a need to have a low cost method of forming a vacuum microelectronic device that achieves the required line spacing and widths.

BRIEF DESCRIPTION OF THE DRAWINGS

FIG. 5 schematically illustrates an enlarged isometric cross-sectional portion of an embodiment of a vacuum microelectronic device in accordance with the present invention.

For simplicity and clarity of illustration, elements in the figures are not necessarily to scale, and the same reference numbers in different figures denote similar elements. Additionally, descriptions and details of well known steps and elements are omitted for simplicity of the description.

DETAILED DESCRIPTION OF THE DRAWINGS

Figure 1:
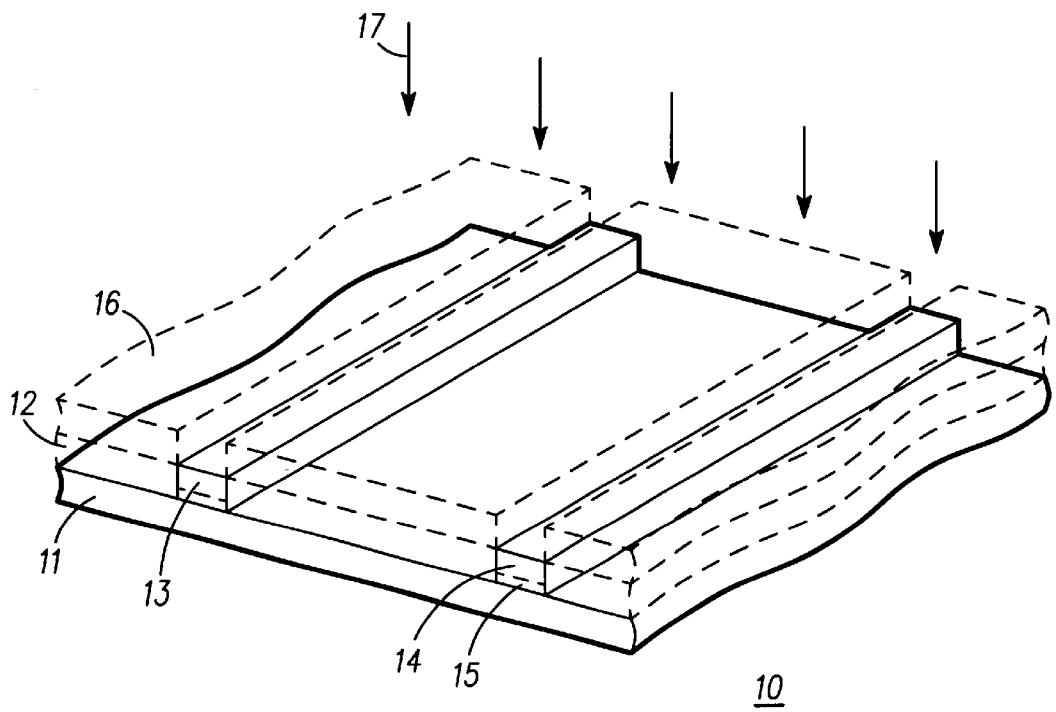
FIG. 1 schematically illustrates an enlarged isometric cross-sectional portion of a vacuum microelectronic device at a manufacturing stage in accordance with the present invention.

FIG. 1 schematically illustrates an enlarged isometric cross-sectional portion of a vacuum microelectronic device 10 that has a low manufacturing cost in addition to small line spacing and width. Device 10 utilizes a substrate 11 that is optically transparent to the light that will subsequently be used for patterning certain elements of device 10. All of substrate 11 may not be optically transparent but the portion used for subsequent patterning as described hereinafter should have such optical transparency. Suitable materials for substrate 11 include various types of glass, including soda-lime silicate, alumino-boro-sillicate, and boro-silicate. A first conductive material or conductive material 12 (illustrated by dashed lines) is disposed to overlie at least a portion of a first side or top side of substrate 11. Conductive material 12 subsequently will be patterned or formed into at least one conductor overlying substrate 11. In the preferred embodiment, conductive material 12 is applied as a blanket on substrate 11 by flood printing techniques such as screen printing with a roller, sprayer, squeegee, or other well known flood printing techniques. Typical conductor line widths less than between two to four microns and line spacing less than fifteen microns are required for typical vacuum microelectronic devices. Additionally, conductor thickness of one to six microns is required to provide low resistance conduction paths. In order to achieve these parameters, conductive material 12 is selected to have a particle size that permits such flood printing techniques to achieve the resolution required to produce the desired conductor patterns. Typically, the particle size should be no greater than the smaller of one tenth the line width or one-half the line thickness. Typical particle size should be less than two to three microns. In the preferred embodiment, conductive material 12 has a particle size no greater than one micron. As will be described hereinafter, the first conductor formed from conductive material 12 will be used as a mask for patterning other elements of device 10. Consequently, the resulting first conductor should be able to block light used for such patterning. In the preferred embodiment, the material used for conductive material 12 is a photosensitive material that blocks ultraviolet light after a firing or sintering process. One such material that is a conductor and would block light after firing is DC202 or DC206 available from DuPont Microcircuit Materials, 14 T W Alexander Dr. Research Triangle Park, N.C., 27709. In other embodiments, a material that forms a conductor without such a firing or sintering process may be used. Alternately, a light blocking layer (illustrated by a dashed line 15) may be formed between substrate 11 and the first conductor in order to permit the first conductor to block the light utilized for the subsequent patterning steps described hereinafter. A suitable material is DC243 also available from available from DuPont Microcircuit Materials.

a mask 16, illustrated by dashed lines, is applied to conductive material 12 in order to pattern conductive material 12 and facilitate forming the first conductor overlying substrate 11. Conductive material 12 is then exposed through mask 16 as illustrated by arrows 17. After exposure, mask 16 is removed, and conductive material 12 is developed to facilitate forming at least one first conductor or conductor 13. Typically a plurality of first conductors, for example first conductor 13 and 14, are formed. In some embodiments the material used for conductive material 12 requires subsequent processing to form the final conductor state. In the preferred embodiment, conductive material 12 remaining after the developing step is then fired or sintered to form first conductors 12 and 14. In this preferred embodiment conductors 13 and 14 are fired at a temperature between four hundred fifty and seven hundred degrees Celsius (450–700° C.) Typically, conductors 13 and 14 are formed to traverse substrate 11 to form electrodes for electron emitters at a plurality of emission sites of device 10 as will be seen subsequently. Those skilled in the art will note that device 10 may have many first conductors formed form conductive material 12, such as conductors 13 and 14, and all such conductors are not shown in the enlarged portion illustrated in FIG. 1. However in some embodiments, such as a diode or triode application, only one first conductor may be formed. Conductors 13 and 14 generally have a spacing of less than twenty microns to provide desired resolution for device 10 and a thickness no greater than three to four microns in order to provide high conductivity and moderate step coverage with respect to dielectric material 18 and conductive material 19. Suitable materials for conductors 13 and 14 include silver, silver-palladium, and gold.

Figure 2:
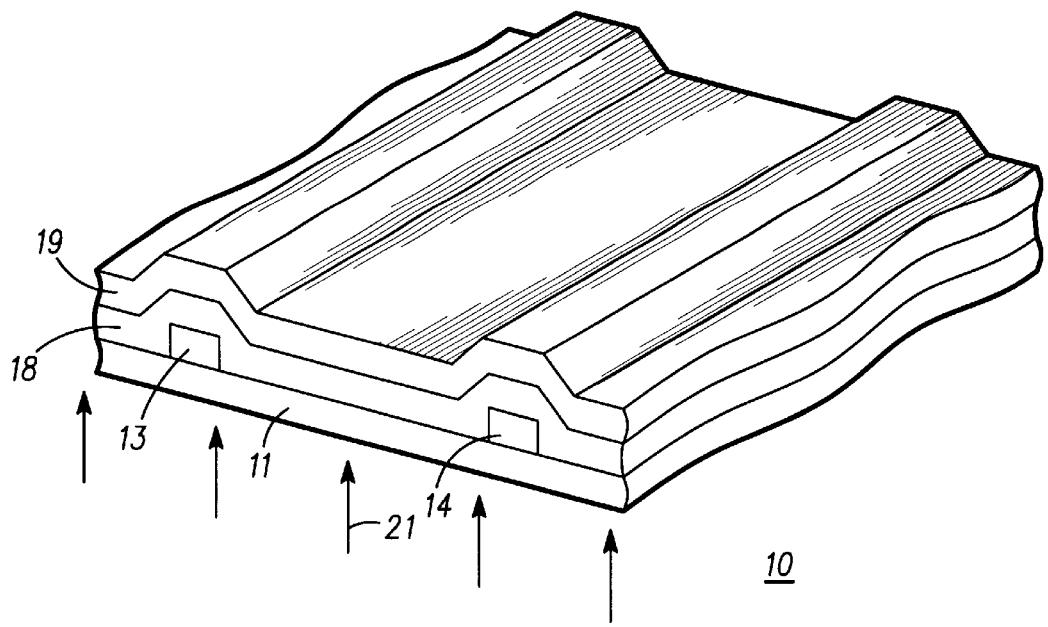
FIG. 2 schematically illustrates the vacuum microelectronic device of FIG. 1 at a subsequent manufacturing stage in accordance with present invention.

FIG. 2 schematically illustrates device 10 at a subsequent manufacturing stage that facilitates using the first conductor as a mask for forming at least a dielectric and a second conductor both of which overlie the first conductor. A dielectric material 18 is disposed overlying at least the portions of conductors 13 and 14 that are to be insulated from other elements of device 10. Thereafter, a second conductive material or conductive material 19 is disposed to overlie dielectric material 18. Dielectric material 18 and conductive material 19 are applied by flood printing techniques that are similar to those utilized for applying first conductive material 12. The materials used for dielectric material 18 and conductive material 19 are photosensitive and have a particle size that is in the same range as the particle size of conductive material 12 (see FIG. 1).

Figure 3:
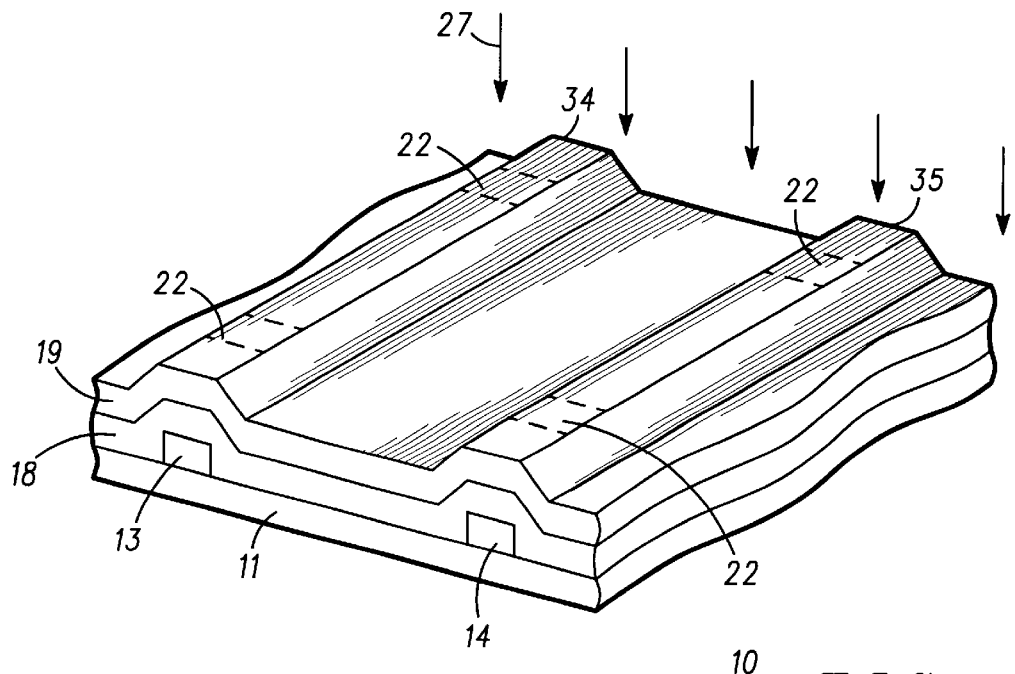
FIG. 3 schematically illustrates the vacuum microelectronic device of FIG. 2 at another manufacturing stage in accordance with the present invention.

Dielectric material 18 and conductive material 19 are patterned by using conductors 13 and 14 as a mask while illuminating a back or second side of substrate 11 with the type of light (illustrated by arrows 21) to which dielectric material 18 and conductive material 19 are sensitive. In the preferred embodiment, dielectric material 18 and conductive material 19 are sensitive to ultraviolet light. It should be noted that a mask (not shown) may also be used to block other section of device 10 that are to remain unexposed during this exposure step.

referring to FIG. 3, after the exposure step described in the explanation of FIG. 2, the portions of both dielectric material 18 and conductive material 19 that overlie conductors 13 and 14 have not been exposed. These are illustrated in FIG. 3 generally by portions 34 and 35. If dielectric material 18 and conductive material 19 were developed at this point, all of portions 34 and 35 would be removed from over conductors 13 and 14. Thus, a subsequent exposure is utilized to form a link or pass-through 22 that provides an electrical connection across portions 34 and 35. A mask (not shown) is applied to expose pass-through 22. Light is then directed toward the first or top surface of device 19, illustrated by arrows 27, to expose pass-through 22. The area or size of pass-through 22 is selected to provide a low resistance path across portions 34 and 35. Each portion 34 and 35 may have any number or size or area for pass-through 22 as long as a low resistance path is provided. Dielectric material 18 and conductive material 19 are then developed.

Figure 4:
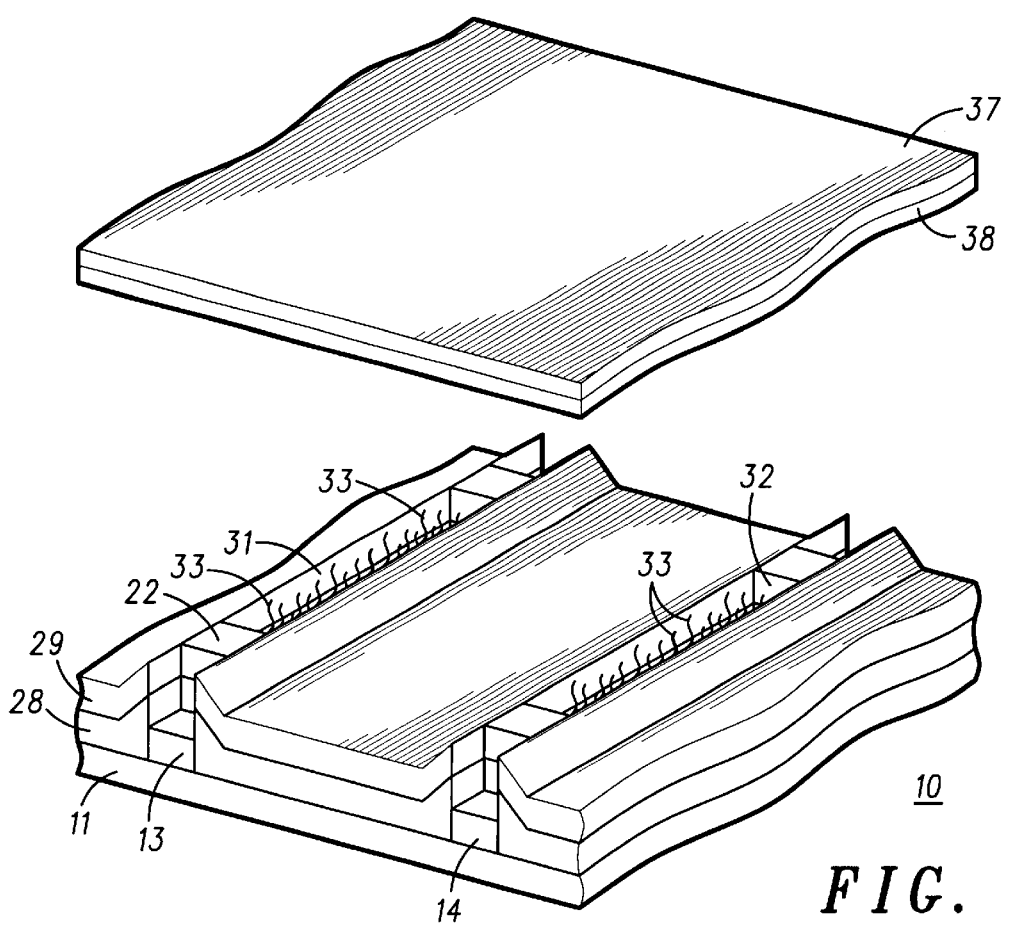
FIG. 4 schematically illustrates the vacuum microelectronic device of FIG. 3 at a subsequent manufacturing stage in accordance with the present invention.

Regarding FIG. 4, the developing step forms at least one opening 31 through conductive material 19 and through dielectric material 18 while leaving pass-through 22 to provide electrical continuity across conductive material 19. Typically a plurality of openings such as openings 31 and 32 are formed for multiple emission sites however some applications, such as a diode or triode, may only require a single opening. In some embodiments the material used for conductive material 19 and dielectric material 18 require subsequent processing to form the final conductor and dielectric state, respectively, of each material. In the preferred embodiment, conductive material 19 and dielectric material 18 are fired or sintered to form second conductor 29 and dielectric 28, respectively. In this preferred embodiment, conductive material 19 and dielectric material 18 are heated to a temperature between four hundred fifty and seven hundred degrees Celsius (450–700° C.) during the firing or sintering operation. In other embodiments, the material used for conductive material 19 and dielectric material 18 may form the desired conductor and dielectric state of second conductor 29 and dielectric 28 without such subsequent processing. Typically, dielectric 28 has a thickness of five to fifteen microns in order to provide high breakdown voltage, minimal bleed, and good electric fields for emitters subsequently formed for device 10. Additionally, conductor 29 generally has a thickness of one to three microns in order to provide good conductivity and nominal field suppression of a anode subsequently formed for device 10.

Openings 31 and 32 expose a surface of conductors 13 and 14, respectively. Electron emitters 33 are then formed on the surfaces of conductors 13 and 14 that are exposed by openings 31 and 32. Emitters 33 can be any of a variety of emitters that are well known to those skilled in the art. For example, emitters 33 may be carbon nanotubes formed on the surface of conductors 13 and 14 after forming openings 31 and 32, or may be carbon nanotubes embedded in the material used for conductors 13 and 14 wherein the emitters are exposed and formed into an emitter condition after forming openings 31 and 32. An anode 37 is generally formed to overly emitters 33 to attract the electrons emitted during operation of device 10. In some applications such as a field emission display, anode 37 may have a phosphor coating 38.

that is important that the edges of openings 31 and 32 overlie conductors 13 and 14, respectively, to provide close control of electrons emitted from emitters 33. Thus, a critical dimension (CD) is the alignment of the edge of openings 31 and 32 to the edges of respective conductors 13 and 14. Because conductors 13 and 14 are used as the mask for forming openings 31 and 32, the alignment is controlled to be less than approximately two microns. Because pass-through 22 is exposed after exposing dielectric material 18 and conductive material 19, the alignment of pass-through 22 is not a critical dimension.

FIG. 5 schematically illustrates an enlarged isometric cross-sectional portion of an embodiment of a vacuum microelectronic device 40 formed by the method described herein. It should be noted that only a portion of device 40 is illustrated, thus, device 40 may include more conductors 13 and 14 than is possible to be shown in such an enlarged illustration. First conductors 13 and 14 are formed on substrate 11 as described hereinbefore. Dielectric 28 and second conductor 29 are then formed as described hereinbefore. An additional second conductor 39 is formed to overly a different portion of substrate 11. Second conductor 39 is formed in a manner similar to conductor 29 and also has similar properties. Optionally, second conductors 29 and 39 may be omitted if device 10 is a diode type of vacuum microelectronic device. Emitters 33 are formed on conductors 13 and 14. An anode 41 is disposed to overly emitters 33 in order to collect electons emitted during operation of device 40. Anode 41 may have phosphor coating income applications.

By now it should be appreciated that there has been provided a novel way to form a vacuum microelectronic device. Using a small particle size for the materials utilized informing the device facilitates the use of lower cost manufacturing techniques such as flood printing. Using a first conductor as a mask for exposing subsequent layers facilitates close alignment between the layers, thus, facilitating small line widths and line spacing. The vacuum microelectronic devices utilizing the method can be used for a variety of applications including field emission displays, Radio Frequency (RF) devices including RF amplifiers, X-Ray sources, diodes, amplifiers including triodes and pentodes, and radiation hardened electronic devices.

While the invention is described with specific preferred embodiments, it is evident that many alternatives and variations will be apparent to those skilled in the semiconductor arts. More specifically those skilled in the art understand that the vacuum microelectronic device may have several first conductors such as conductors 13 and 14 and second conductors 29 and 39.

What is claimed is:

1. A method of forming a vacuum microelectronic device comprising:

providing a substrate wherein a portion is optically transparent;

using flood printing for forming a first conductor overlying a portion of the substrate;

using flood printing for forming a dielectric and a second conductor overlying the first conductor wherein a portion of the first conductor is exposed by at least one opening through the second conductor and through the dielectric and wherein the first conductor is used as a mask while forming the dielectric and the second conductor; and forming electron emitters on the portion of the first conductor exposed by the at least one opening.

2. The method of claim 1 further including forming the first conductor, and the second conductor to have a thickness of one to four microns.

3. The method of claim 1 further including using a material having a particle size no greater than two microns for forming the first conductor, the dielectric, and the second conductor.

4. The method of claim 1 further including forming an anode overlying the electron emitters.

5. A method of forming a vacuum microelectronic device comprising:

providing a substrate, at least a portion of the substrate having ultraviolet transparency wherein the substrate has a first side and a second side;

disposing a first conductive material having ultraviolet sensitivity overlying at least a portion of the first side of the substrate;

patterning the first conductive material for forming a first conductor;

applying a dielectric material having ultraviolet sensitivity overlying at least a portion of the first conductor;

applying a second conductive material having ultraviolet sensitivity to overly portions of the dielectric material and portions of the first conductor; and using the first conductor as a mask to pattern the dielectric material and the second conductive material.

6. The method of claim 5 further including:

forming the first conductor to block ultraviolet light prior to applying the dielectric material; and illuminating at least a portion of the second side of the substrate with ultraviolet light while using the first conductor as the mask to pattern the dielectric material and the second conductive material.

7. The method of claim 6 wherein forming the first conductor to block ultraviolet light includes using a step selected from the group including firing the first conductive material subsequently to patterning the first conductive material and prior to applying the dielectric material, or disposing the first conductive material.

8. The method of claim 5 wherein using the first conductor as the mask to pattern the dielectric material and the second conductive material includes the steps of:

using the first conductor as the mask while exposing the dielectric material and the second conductive material to ultraviolet light;

exposing a pass-through portion of the second conductive material and the dielectric material wherein the pass-through portion was not exposed in the step of using the first conductor as the mask;

developing the dielectric material and the second conductive material; and firing the second conductive material for forming a second conductor.

9. The method of claim 8 further including forming a plurality of first conductors and a plurality of second conductors having a line spacing of less than 20 microns.

10. The method of claim 5 further including forming electon emitters on the first conductive material after the step of using the first conductor as the mask.

11. The method of claim 5 wherein disposing the first conductive material includes flood printing the first conductive material.

12. The method of claim 5 wherein the steps of applying the dielectric material and applying the second conductive material includes flood printing the dielectric material and flood printing the second conductive material.

13. The method of claim 5 further including using a particle size no greater than one micron for the first conductive material, the dielectric material, and the second conductive material.

14. The method of claim 5 further including using a thickness no greater than fifteen microns for the dielectric material.

15. A method of forming a vacuum microelectronic device comprising:

providing a substrate, at least a portion of the substrate having ultraviolet transparency wherein the substrate has a first side and a second side;

applying a first conductive material overlying the substrate wherein the first conductive material is applied by flood printing and the first conductive material has a particle size no greater than one micron;

patterning the first conductive material from the first side of the substrate to form a first conductor;

applying a dielectric material overlying at least a portion of the first conductor wherein the dielectric material is applied by flood printing and the dielectric material has a particle size no greater than one micron;

applying a second conductive material overlying portions of the dielectric material and portions of the first conductor wherein the dielectric material is applied by flood printing and the dielectric material has a particle size no greater than one micron; and using the first conductor as a mask to pattern the dielectric material and the second conductive material.

16. The method of claim 15 further including using a thickness no greater than fifteen microns for the first conductive material,the dielectric material, and the second conductive material.

17. The method of claim 15 further including using an ultraviolet sensitive material for the dielectric material and the second conductive material.

18. The method of claim 17 wherein using the first conductor as the mask to pattern the dielectric material and the second conductive material includes the steps of:
- using the first conductor as the mask while exposing the dielectric material and the second conductive material to ultraviolet light;
- exposing a pass-through portion of the second conductive material and the dielectric material wherein the pass-through portion was not exposed in the step of using the first conductor as the mask; and
- developing the dielectric material and the second conductive material for exposing a portion of the first conductor.

19. The method of claim 18 further including forming electron emitters on the portion of the first conductor that is exposed.

20. The method of claim 15 wherein patterning the first conductive material from the first side of the substrate to form the first conductor includes firing a portion of the first conductive material to form the first conductor.

* * * * *